United States Patent
Grossman et al.

(10) Patent No.: US 7,374,734 B2
(45) Date of Patent: May 20, 2008

(54) ABSORBING AGENT AND METHOD FOR ELIMINATING ACID GASES FROM FLUIDS

(75) Inventors: Christoph Grossman, The Woodlands, TX (US); Norbert Asprion, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 339 days.

(21) Appl. No.: 10/545,023

(22) PCT Filed: Jan. 24, 2004

(86) PCT No.: PCT/EP2004/000601

§ 371 (c)(1),
(2), (4) Date: Aug. 10, 2005

(87) PCT Pub. No.: WO2004/071624

PCT Pub. Date: Aug. 26, 2004

(65) Prior Publication Data
US 2006/0138384 A1    Jun. 29, 2006

(30) Foreign Application Priority Data
Feb. 14, 2003   (DE)   ................. 103 06 254

(51) Int. Cl.
*B01D 19/00* (2006.01)
*B01D 53/40* (2006.01)
*C09K 3/00* (2006.01)

(52) U.S. Cl. .............. 423/220; 423/228; 423/229; 423/236; 423/242.7; 252/182.12; 252/184; 252/189; 252/190; 210/749; 210/750; 208/208 R; 208/236; 208/237; 48/127.3; 48/127.5

(58) Field of Classification Search ............... 423/220, 423/228, 229, 236, 242.7; 252/182.12, 184, 252/189, 190; 210/749, 750; 208/208 R, 208/236, 237; 48/127.3, 127.5
See application file for complete search history.

(56) References Cited

U.S. PATENT DOCUMENTS

| 4,336,233 | A | 6/1982 | Appl et al. |
| 4,537,753 | A | 8/1985 | Wagner et al. |
| 4,551,158 | A | 11/1985 | Wagner et al. |
| 4,553,984 | A | 11/1985 | Volkamer et al. |
| 4,997,630 | A | 3/1991 | Wagner et al. |
| 4,999,031 | A | 3/1991 | Gerhardt |
| 5,098,681 | A | 3/1992 | Christiansen et al. |
| 5,262,139 | A | 11/1993 | Hakka et al. |
| 5,618,506 | A | 4/1997 | Suzuki et al. |

(Continued)

FOREIGN PATENT DOCUMENTS

DE    A 10 94 429    10/1953

(Continued)

OTHER PUBLICATIONS

International Search Report.

*Primary Examiner*—Timothy C. Vanoy
(74) *Attorney, Agent, or Firm*—Connolly Bove Lodge and Hutz

(57) ABSTRACT

The disclosure relates to an absorbent for removing acid gases from fluids. The absorbent contains at least one tertiary amine, an amine which is selected from hydroxyethylpiperazine, bis(hydroxyethylpiperazine) or a mixture of these and piperazine. The absorbent may optionally contain a physical solvent for the acid gases.

20 Claims, 4 Drawing Sheets

U.S. PATENT DOCUMENTS

| | | | |
|---|---|---|---|
| 5,620,940 A | 4/1997 | Birbara et al. | |
| 6,436,174 B1 | 8/2002 | Grossmann et al. | |
| 6,689,332 B1 * | 2/2004 | Yoshida et al. | 423/220 |
| 2007/0020163 A1 * | 1/2007 | Asprion et al. | 423/220 |

FOREIGN PATENT DOCUMENTS

| | | |
|---|---|---|
| DE | A 15 42 415 | 4/1970 |
| DE | A 21 34 379 | 7/1970 |
| DE | A 100 28 637 | 9/2000 |
| EP | 0 121 109 | 2/1984 |
| EP | A 0 159 495 | 1/1985 |
| EP | A 0 160 203 | 3/1985 |
| EP | A 0 190 434 | 6/1985 |
| EP | A-0 202 600 | 5/1986 |
| EP | A 0 359 991 | 8/1989 |
| EP | A 0 581 026 | 6/1993 |
| GB | 1058304 | 11/1965 |
| WO | WO-A 99/02244 | 1/1998 |
| WO | WO-A 00/00271 | 6/1999 |
| WO | WO-A 00/66249 | 5/2000 |

* cited by examiner

ABSORBING AGENT AND METHOD FOR ELIMINATING ACID GASES FROM FLUIDS

RELATED APPLICATIONS

This application is a national stage application (under 35 U.S.C. 371) of PCT/EP04/000601, filed on Jan. 24, 2004 which claims benefit to German application no. 103 06 254.8 filed Feb. 14, 2003.

The present invention relates to an absorbent and a process for removing acid gases from fluids.

In numerous processes of the chemical industry, fluid streams occur which comprise acid gases, for example $CO_2$, $H_2S$, $SO_2$, $CS_2$, HCN, COS or mercaptans, as impurities. These fluid streams can be, for example, gas streams (such as natural gas, synthesis gas from heavy oil or heavy residues, refinery gas, or reaction gases formed in the partial oxidation of organic materials, for example coal or petroleum) or liquid or liquefied hydrocarbon streams (such as liquefied petroleum gas (LPG) or natural gas liquids (NGL)). Before these fluids can be transported or further processed, the acid gas content of the fluid must be significantly reduced. $CO_2$, for example, must be removed from natural gas, since a high concentration of $CO_2$ decreases the heating value of the gas. Furthermore $CO_2$ in combination with the water frequently entrained in fluid streams can lead to corrosion on pipes and fittings.

Removing sulfur compounds from these fluid streams is of particular importance for various reasons. For example, the content of sulfur compounds of natural gas must be reduced by suitable treatment measures directly at the natural gas source, since the sulfur compounds also form acids together with the water which is frequently entrained by the natural gas, which acids are corrosive. To transport the natural gas in a pipeline, therefore, preset limit values of the sulfur-containing impurities must be complied with. Furthermore, numerous sulfur compounds are foul-smelling even at low concentrations, and, in particular hydrogen sulfide, toxic.

It is known to remove the unwanted acid gas constituents from the fluids by gas scrubbing or by liquid/liquid extraction with aqueous or nonaqueous mixtures of organic solvents as absorbents. Not only physical solvents, but also chemical solvents, come into consideration here. Known physical solvents are, for example, cyclotetramethylene sulfone (sulfolane), N-methylpyrrolidone and N-alkylated piperidones. Of the chemical solvents, those which have proved themselves industrially are, in particular, the aqueous solutions of primary, secondary and tertiary aliphatic amines and alkanolamines, such as monoethanolamine (MEA), diethanolamine (DEA), monomethylethanolamine (MMEA), diethylethanolamine (DEEA), triethanolamine (TEA), diisopropanolamine (DIPA) and methyldiethanolamine (MDEA). Primary and secondary amines can react with $CO_2$ forming carbamates. Carbamates are generally formed in a rapid reaction.

In contrast to primary and secondary alkanolamines, tertiary alkanolamines do not react directly with $CO_2$, since the amine is completely substituted. Rather, $CO_2$ is converted to bicarbonate in a slow reaction with the tertiary alkanolamine and water. Tertiary amines are suitable, therefore, in particular for selective removal of $H_2S$ from gas mixtures which comprise $CO_2$ and $H_2S$. Because of the slow reaction of carbon dioxide, in the gas scrubbing, the scrubbing process with tertiary alkanolamine solutions must be carried out with a high liquid/gas ratio with a correspondingly high solvent recirculation rate. Therefore, attempts have been made to increase the absorption rate of $CO_2$ in aqueous solutions of tertiary alkanolamines by adding further compounds which are called activators or promoters (DE-A 15 42 415, DE-A 10 94 428, EP-A 0 160 203).

One of the most effective absorption liquids for removing $CO_2$ and $H_2S$ from a gas stream is an aqueous solution of methyldiethanolamine (MDEA) and piperazine as absorption accelerator or activator. An absorbent of this type is disclosed by U.S. Pat. No. 4,336,233; EP 359991, WO 00/66249 and WO 00/00271.

U.S. Pat. No. 5,618,506 describes a process for removing $CO_2$ from a combustion gas using an absorbent which comprises a mixture of a secondary amine and a tertiary amine. The tertiary amine can be N-methyldiethanolamine and the secondary amine used can be piperazine and piperazines which are alkyl-substituted on the ring carbon atoms. Piperazines which are substituted on the nitrogen atom or atoms are not used, in contrast.

WO 99/02244 describes a process for removing acid gases from gas streams using an absorbent which comprises a mixture of a secondary alkanolamine, in particular diethanolamine, and a tertiary alkanolamine, in particular triethanolamine. Piperazine compounds are not used.

U.S. Pat. Nos. 5,098,681 and 5,262,139 describe processes for removing $SO_2$ from gas streams, hydroxyethylpiperazine or bis(hydroxyethylpiperazine) being used as absorbents.

The processes of the prior art share the fact that they still have a high energy consumption and high solvent circulation rate. In addition, parts of the plant must be built of stainless steel, which leads to high plant costs. To achieve an improvement here, absorbents having a high absorption capacity and relativity high absorption rate are required, with simultaneously improved corrosion protection.

It is an object of the present invention, therefore, to provide an absorbent having higher absorption capacity and higher absorption rate.

We have found this object is achieved, surprisingly, by an absorbent that comprises a tertiary amine and hydroxyethylpiperazine or bis(hydroxyethylpiperazine).

The present invention therefore relates to an absorbent for removing acid gases from fluids, in particular gas streams, which comprises:

a) at least one tertiary alkanolamine (amino component a) and b) an amine which is selected from hydroxyethylpiperazine, bis(hydroxyethylpiperazine) or a mixture thereof (amine component b).

The invention also relates to a process for removing acid gases from fluids in which, in an absorption step, a fluid stream comprising the acid gases is contacted with the inventive aqueous absorbent, a fluid stream depleted in acid gases and an absorbent enriched with acid gases being obtained.

Furthermore, the object is to provide an absorbent concentrate from which the absorbent can be prepared simply by adding water.

Figure 1:
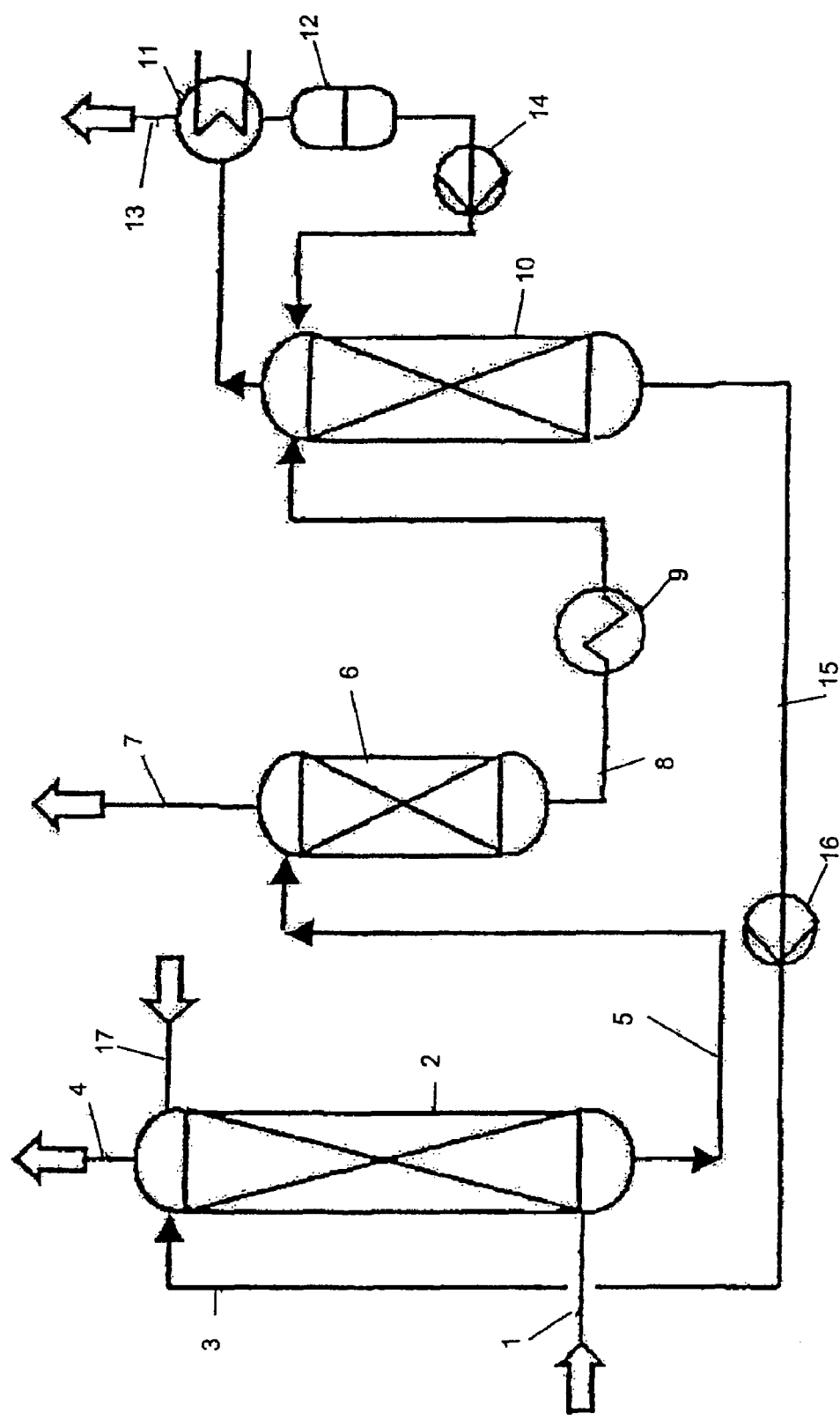
FIG. 1 shows a diagrammatic representation of the process sequence of an embodiment of the inventive process having single-stage absorption.

The tertiary alkanolamine can be a trialkanolamine, alkyldialkanolamine or dialkylalkanolamine. The alkyl groups can be straight-chain or branched and generally have from one to four carbon atoms. The alkanol groups generally have from two to four carbon atoms. Examples of tertiary alkanolamines are: triethanolamine, tributanolamine, diethanolamine, diethylethanolamine, dimethylethanolamine, dimethylpropanolamine and, preferably, methyldiethanolamine (MDEA).

Preferably, the inventive absorbent can also comprise piperazine as additional activator.

Hydroxyethylpiperazine and bis(hydroxyethylpiperazine) are preferably used as a mixture.

The total amine content of the inventive absorbent is generally in the range 20-70% by weight, preferably 20-60% by weight, and in particular 20-55% by weight, based on the total weight of the absorbent.

The concentration of the amine component a) is generally in the range from 15 to 60% by weight, preferably from 15 to 55% by weight, and in particular from 15 to 50% by weight, based on the total weight of the absorbent.

The concentration of the amine component b) is generally in the range 1-10% by weight, preferably 1-8% by weight, and in particular 1-5% by weight, based on the total weight of the absorbent.

If piperazine (amine component c)) is used, it is present in the absorbent as a concentration of 1-30% by weight, preferably 1-20% by weight, and in particular 1-10% by weight, based on the total weight of the absorbent. The content of amine component a) is then reduced accordingly, so that the total proportion of components a) and c) of the total weight of the absorbent remains in the ranges specified for component a). The remainder to 100% by weight can be water.

The absorbent can also comprise other amines suitable for the abstraction of acid gases, for example diethanolamine, monomethylethanolamine, diisopropanolamine, 3-methylaminopropylamine etc (amine component d)). If present, the amine component d) can be present in an amount of from about 1 to 10% by weight, preferably from 1 to 5% by weight, based on the total weight of the absorbent. The proportion of the amine component a) is then decreased accordingly, so that the total proportion of components a), c) and d) of the total weight of the absorbent remains in the ranges specified for component a).

The amine components b) and c) are particularly expediently prepared in the form of a mixture which is composed as follows.

| | |
|---|---|
| Hydroxyethylpiperazine: | 40% by weight (35-45) |
| Bis(hydroxyethylpiperazine): | 20% by weight (15-25) |
| Piperazine: | 15% by weight (10-20) |
| Water: | Remainder to 100% |

A mixture of this type is produced, for example, as reaction effluent in the synthesis of hydroxyethylpiperazine and is called CHEP (crude hydroxyethylpiperazine).

The absorbent can also comprise physical solvents, such as sulfolane, N-methylpyrrolidone or N-alkylated piperidones. If present, the physical solvents can be present in an amount of about 5-20% by weight, based on the total weight of the absorbent.

The absorbent can also comprise additives, such as corrosion inhibitors, enzymes, etc. Generally, the amount of such additives is in the range of about 0.01-3% by weight of the absorbent.

The inventive absorbent is suitable for treating fluids, in particular gas streams of all types. The acid gases are, in particular, $CO_2$, $H_2S$, COS and mercaptans. In addition, $SO_3$, $SO_2$, $CS_2$ and HCN can also be removed. Fluids comprising the acid gases are firstly gases, such as natural gas, synthesis gas, coke oven gas, gasified coal, circulation gas, landfill gases and combustion gases, and secondly liquids which are essentially immiscible with the absorbent, such as liquefied petroleum gas (LPG) or natural gas liquids (NGL). The fluid streams can, in addition to one or more of said acid gases, comprise further inert gas constituents which are not absorbed by the absorbent in significant quantities. Examples are volatile hydrocarbons, preferably $C_1$-$C_4$-hydrocarbons, such as methane, in addition nitrogen and hydrogen. The inventive process is particularly suitable for removing $CO_2$ and $H_2S$.

The inventive absorbent is suitable for removing acid gases (hereinafter also called acid gas constituents) from gases which are not themselves absorbed by the absorbent, and for extracting acid gases from liquids which are essentially immiscible with the absorbent. The process sequence of a gas scrubbing is described in principle below, as are possible variants which lie within the scope of the present invention. The process can be applied to liquids without problem by those skilled in the art. The regeneration of the absorbent is identical in the case of liquids and gases.

The starting gas (untreated gas) rich in acid gas constituents is contacted with the inventive absorbent in an absorber in an absorption step, as a result of which the acid gas constituents are at least partially scrubbed out.

A scrubbing apparatus preferably used in conventional gas scrubbing processes acts as absorber. Suitable scrubbing apparatuses are, for example, random packings, ordered packing columns and tray columns, membrane contactors, radial-stream scrubbers, jet scrubbers, venturi scrubbers, and rotary spray scrubbers, preferably ordered packing columns, randomly packed columns and tray columns, particularly preferably ordered packing columns and randomly packed columns. The fluid stream is preferably treated with the absorbent in a column in countercurrent flow. The fluid in this case is generally fed into the lower region of the column and the absorbent into the upper region of the column.

The temperature of the absorbent in the absorption step is generally from about 40 to 100° C., when a column is used, for example, from 40 to 70° C. at the top of the column and from 50 to 100° C. at the bottom of the column. The overall pressure in the absorption step is generally from about 1 to 120 bar, preferably from about 10 to 100 bar. A product gas (clean gas) which has low contents of acid gas constituents, that is to say a product gas which is depleted in these constituents, is obtained, and an absorbent which is loaded with acid gas constituents is obtained.

The inventive process can comprise one or more, in particular two, sequential absorption steps. The absorption can be carried out in a plurality of sequential part-steps, the untreated gas comprising the acid gas constituents being contacted in each of the part-steps in each case with one substream of the absorbent. The absorbent with which the untreated gas is contacted can already be partly loaded with acid gases, that is to say it can be, for example, an absorbent which has been recirculated to the first absorption step from a following absorption step, or a partially regenerated absorbent. With respect to the procedure of the two-stage absorption, reference is made to the publications EP-A 0 159 495, EP-A 0 20 190 434, EP-A 0 359 991 and WO 00100271.

According to a preferred embodiment, the inventive process is carried out in such a manner that the fluid comprising the acid gases is first treated in a first absorption step with the absorbent at a temperature of from 40 to 100° C., preferably from 50 to 90° C., and in particular from 60 to 90° C. The fluid depleted in acid gases is then treated in a second absorption step with the absorbent at a temperature from 30 to 90° C., preferably from 40 to 80° C., and in particular from 50 to 80° C. The temperature in this absorption step is from 5 to 20° C. lower than in the first absorption stage.

The acid gas constituents can be liberated in a regeneration step in a customary manner (in a similar manner to the publications cited below) from the absorbent loaded with the acid gas constituents, a regenerated absorbent being obtained. In the regeneration step, the absorbent loading is decreased and the resultant regenerated absorbent is preferably then recirculated to the absorption step.

Generally, the regeneration step comprises at least one depressurization of the loaded absorbent from a high pressure, such as prevails when the absorption step is being carried out, to a lower pressure. The depressurization can take place, for example, by means of a throttle valve and/or by an expansion turbine. The regeneration using an expansion stage is described, for example, in the publications U.S. Pat. Nos. 4,537,753 and 4,553,984.

The acid gas constituents can be liberated in the regeneration step, for example, in an expansion column, for example a vertical or horizontal flash container, or a countercurrent-flow column possessing internals. A plurality of expansion columns can be connected in series in which regeneration is formed at differing pressures. For example, in a pre-expansion column, regeneration can be carried out at high pressure, which is typically approximately 1.5 bar above the partial pressure of the acid gas constituents in the absorption step, and in a main expansion column, at low pressure, for example from 1 to 2 bar absolute. The regeneration using two or 30 more expansion stages is described in the publications U.S. Pat. Nos. 4,537,753, 4,553,984, EP-A 0 159 495, EP-A 0 202 600, EP-A 0 190 434 and EP-A 0 121 109.

A process variant having two low-pressure expansion stages (from 1 to 2 bar absolute) in which the absorption liquid which is partially regenerated in the first low-pressure expansion stage is heated, and in which, if appropriate, before the first low-pressure expansion stage, a medium-pressure expansion stage, in which the expansion is performed to at least 3 bar, is described in DE 100 28 637. The loaded absorption liquid is first expanded in a first low-pressure expansion stage to a pressure of from 1 to 2 bar (absolute). The partially regenerated absorption liquid is then heated in a heat exchanger and then again expanded in a second low-pressure expansion stage to a pressure of from 1 to 2 bar (absolute).

The last expansion stage can also be carried out under vacuum, which is produced, for example, by means of a steam jet, if appropriate in combination with a mechanical vacuum generation apparatus, as described in EP-A 0 159 495, EP-A 0 202 600, EP-A 0 190 434 and EP-A 0 121 109 (U.S. Pat. No. 4,551,158).

Because of the optimum matching of the content to the amine components, the inventive absorbent has a high loading capacity with acid gases, which can also be readily desorbed. As a result, in the inventive process, the energy consumption and the solvent circulation can be significantly reduced.

The inventive process will be described below with reference to FIGS. 1 and 2.

FIG. 1 shows diagrammatically an apparatus in which the absorption stage is carried out in a single stage and the expansion stage is carried out in two stages. The feed gas is fed into the lower region of the absorber 2 via line 1. The absorber 2 is a column which is packed with random packing elements to effect the mass transfer and heat exchange. The absorbent, which is a regenerated absorbent having a low residue content of acid gases, is passed via line 3 to the top of the absorber 2 in countercurrent flow to the feed gas. The gas which is depleted in acid gases leaves the absorber 2 overhead (line 4). The absorbent which is enriched with acid gases leaves the absorber 2 at the bottom via line 5 and is passed into the upper region of the high-pressure expansion column 6, which is generally operated at a pressure which is above the $CO_2$ partial pressure of the untreated gas fed to the absorber. The absorbent is generally expanded using customary apparatuses, for example a level control valve, a hydraulic turbine, or a pump running in reverse. During expansion, the majority of the dissolved non-acidic gases and a small part of the acid gases are released. These gases are injected via line 7 from the high-pressure expansion column 6 overhead.

The absorbent, which is still loaded with the majority of the acid gases, leaves the high-pressure expansion column via line 8 and is heated in the heat exchanger 9, in which case a small part of the acid gases can be liberated. The heated absorbent is introduced into the upper region of a low-pressure expansion column 10 which is equipped with a random packing to achieve a high surface area and thus to cause the liberation of the $CO_2$ and to establish equilibrium. In the low-pressure expansion column 10, the majority of the $CO_2$ and the $H_2S$ are virtually completely liberated by flashing. The absorbent is simultaneously regenerated and cooled in this manner. At the top of the low-pressure expansion column 10, a reflux condenser 11 and a trapping vessel 12 are provided, in order to cool the acid gases liberated and to condense a part of the vapor. The majority of the acid gas leaves the reflux condenser 11 via line 13. The condensate is pumped back by means of pump 14 to the top of the low-pressure expansion column 10. The regenerated absorbent, which still comprises a small part of the $CO_2$, leaves the low-pressure expansion column 10 at the bottom via line 15 and is passed by means of pump 16 via line 3 to the top of the absorber 2. Via line 17, fresh water can be fed in to compensate for the water discharged together with the gases.

Figure 2:
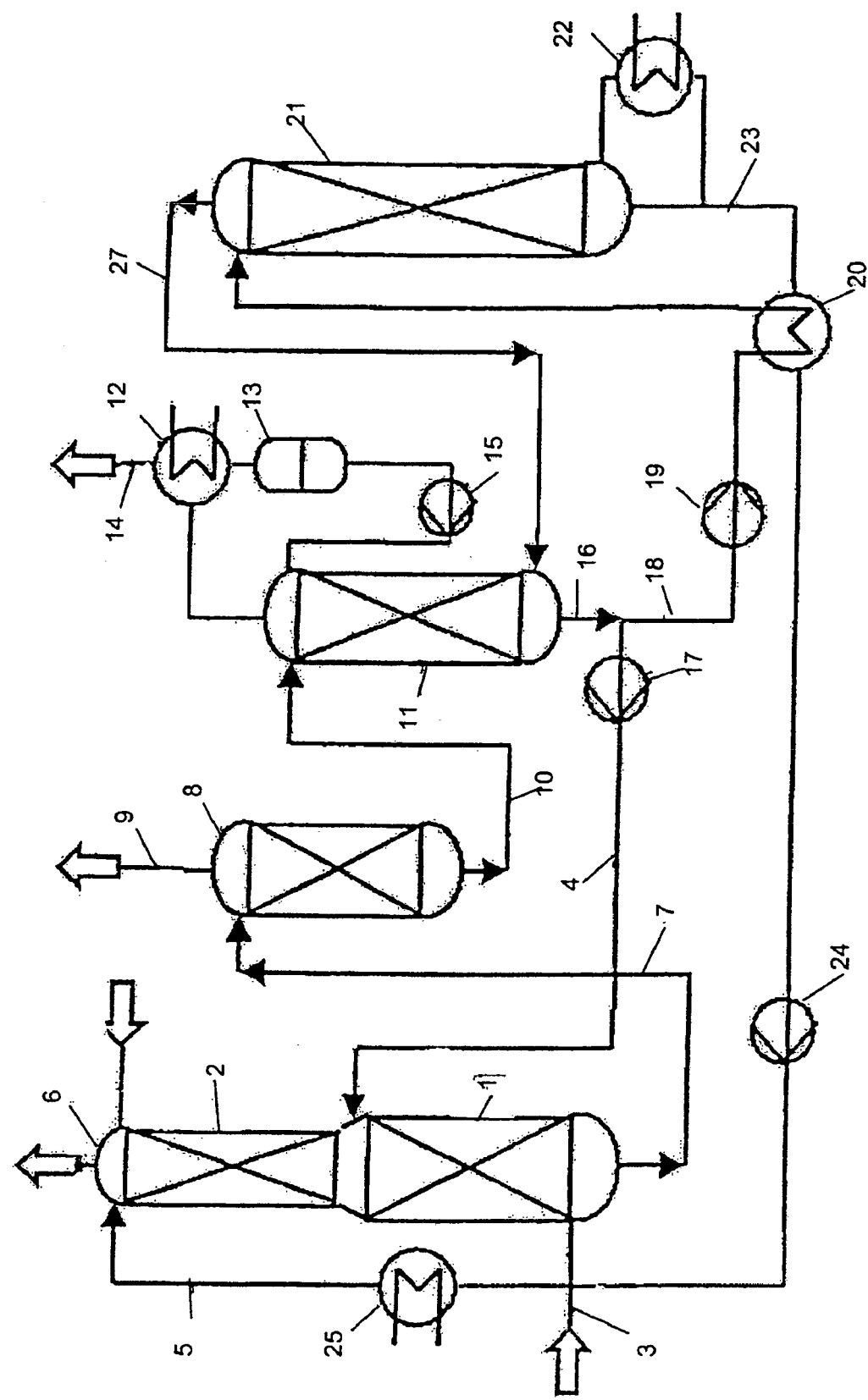
FIG. 2 shows a diagrammatic representation of the process sequence of an embodiment of the invention process having two-stage absorption.

FIG. 2 shows diagrammatically an apparatus for carrying out the inventive process, using a two-stage absorber and a two-stage expansion. The absorber comprises the dirty absorber 1 and the clean absorber 2. The feed gas is fed into the lower region of the dirty absorber 1 via line 3 and is treated in countercurrent flow with regenerated absorbent which is passed via line 4 to the top of the dirty absorber 1 and still comprises some acid gases. Regenerated absorbent is passed to the top of the clean absorber 2 via line 5, which regenerated absorbent essentially no longer comprises acid gases. Both parts of the absorber comprise an ordered packing to effect the mass transfer and heat exchange between dirty gas and absorbent. The treated gas leaves the clean absorber 2 overhead (line 6). The absorbent loaded with acid gases is discharged at the bottom of the dirty absorber 1 and is fed into the upper region of the high-pressure expansion column 8 via line 7. The column 8 is equipped with an ordered packing and is operated at a pressure which is between the pressure in the absorber and the subsequent low-pressure expansion column 11. The absorbent which is loaded with acid gases is expanded using customary apparatuses, for example a level controller, a hydraulic turbine or a pump running in reverse. During the high-pressure expansion, the majority of the dissolved non-acidic gases and a small part of the acid gases are liberated. These gases are ejected overhead via line 9 from the high-pressure expansion column 8.

The absorbent, which is still loaded with the majority of the acid gases, leaves the high-pressure expansion column 8 via line 10 and is fed into the upper region of the low-pressure expansion column 11, where the majority of the $CO_2$ and $H_2S$ are liberated by flashing. The absorbent is regenerated in this manner. The low-pressure expansion column 11 is equipped with an ordered packing in order to provide a high surface area for the heat exchange and mass transfer. A reflux condenser 12 together with condensate vessel 13 is provided at the top of the low-pressure expansion column 11, in order to cool the acid gases exiting overhead from the low-pressure expansion column 11 and to condense a part of the vapor. The non-condensed gas which contains the majority of the acid gases is discharged via line 14. The condensate from the condensate vessel 13 is passed via pump 15 to the top of the low-pressure expansion column 11.

The partially regenerated absorbent which still comprises a part of the acid gases leaves the low-pressure expansion column 11 at the bottom via line 16 and is divided into two part-streams. The larger part-stream is passed via pump 17 and line 4 to the top of the dirty absorber 1, whereas the smaller part is heated via line 18 by means of pump 19 in heat exchanger 20. The heated absorbent is then fed into the upper region of the stripper 21 which is equipped with an ordered packing. In the stripper 21 the majority of the absorbed $CO_2$ and $H_2S$ are stripped out by vapor which is generated in the reboiler 22 and is fed into the low region of the stripper 21. The absorbent leaving the stripper 21 at the bottom via line 23 has only a small residue content of acid gases. This absorbent is passed through the heat exchanger 20, the partially regenerated absorbent coming from the low-pressure expansion column 11 being heated. The cooled regenerated absorbent is pumped back by means of pump 24 through heat exchanger 25 to the top of the clean absorber 2. Fresh water can be applied via line 26 to the top of the clean absorber 2, in order to replace water discharged via the gas streams. The gas exiting overhead from the stripper 21 is fed via line 27 into the lower region of the low-pressure expansion column 11.

EXAMPLE 1

Figure 3:
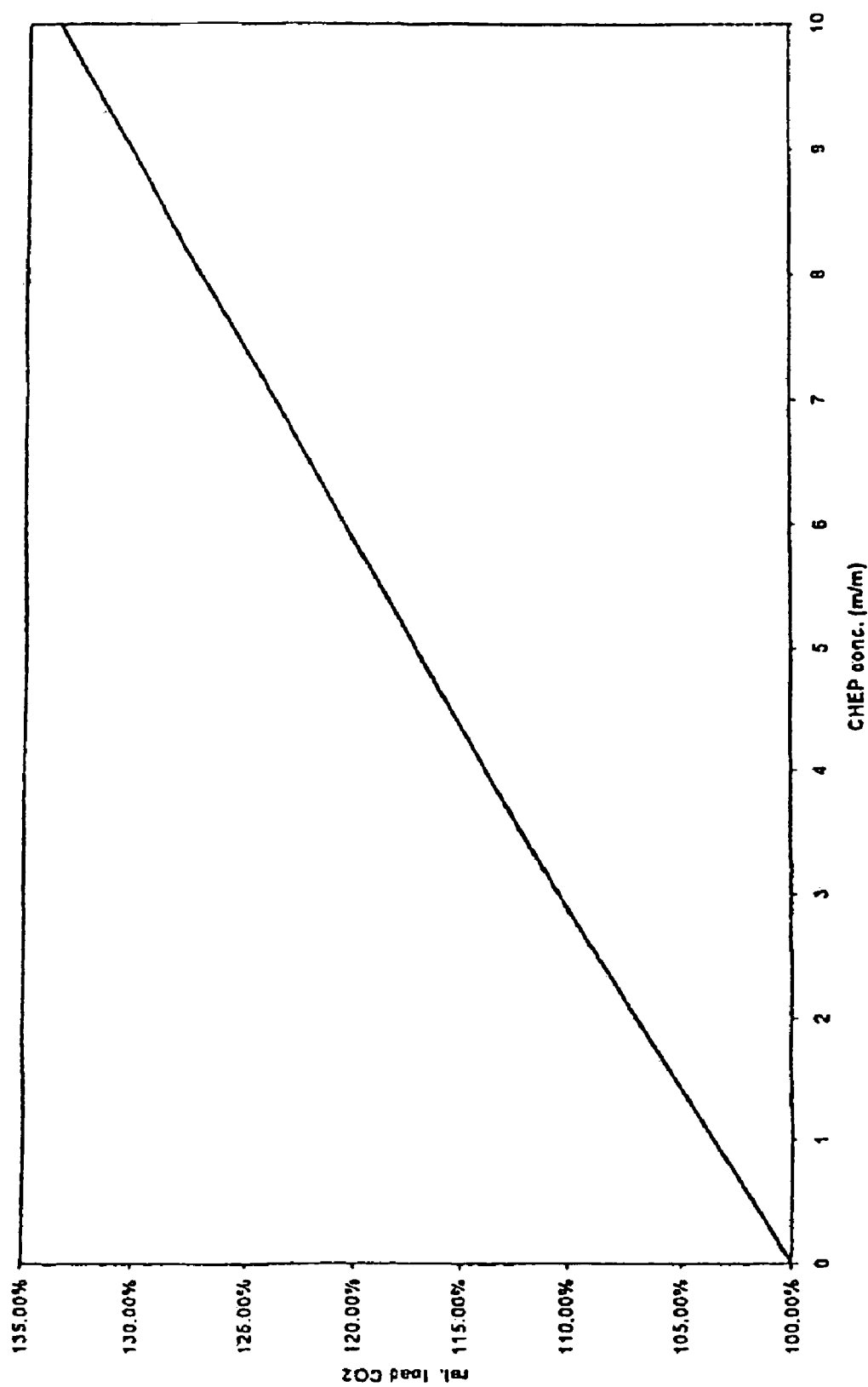
FIG. 3 shows the relative $CO_2$ equilibrium loading of an inventive absorbent relative to an absorbent of the prior art.

Calculations were carried out using a phase equilibrium model (Pitzer model; Kenneth S. Pitzer, Activity Coefficients in Electrolyte Solutions 2nd Ed., CRC-Press, 1991, Chapt. 3, Ion Interaction Approach: Theory and Data Correlation; the parameters of the model were matched to phase equilibrium measurements in the system $CO_2/H_2O/MDEA/$ piperazine/CHEP). An aqueous absorbent was used as a basis which comprises CHEP in increasing amounts dissolved in a mixture of 5% by weight piperazine, 35% by weight of MDEA and water. FIG. 3 shows the relative $CO_2$ equilibrium loading of the inventive absorbent relative to the $CO_2$ equilibrium loading of an absorbent comprising 5% by weight of piperazine, 35% by weight of MDEA and 60% by weight of water. It can be seen that the inventive absorbent has a higher loading capacity with $CO_2$ over the entire range than the comparison absorbent. By increasing the CHEP content to 10% by weight, the loading capacity with $CO_2$ can be increased by about 35% under the conditions selected.

EXAMPLE 2

Figure 4:
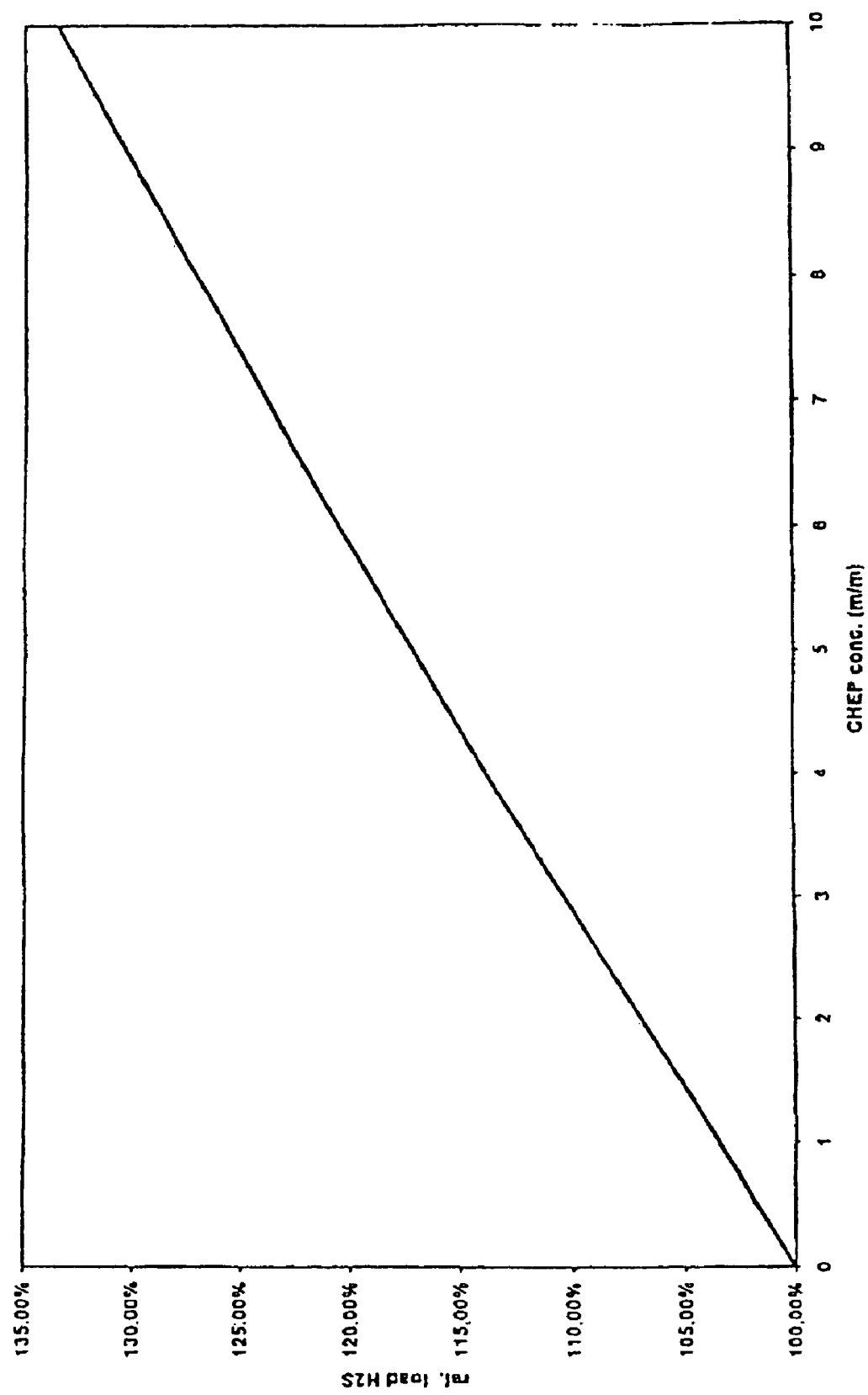
FIG. 4 shows the relative $H_2S$ equilibrium loading of an inventive absorbent relative to an absorbent of the prior art.

The $H_2S$ equilibrium loading was determined in a similar manner to example 1. The results are shown in FIG. 4. It can be seen that the inventive absorbent has a higher loading capacity with $H_2S$ over the entire range than the comparison absorbent.

EXAMPLE 3

The relative mass transfer rate of $CO_2$ into an absorbent which comprises 5% by weight of CHEP, 5% by weight of piperazine, 30% by weight of MDEA and 60% by weight of water was studied in relation to the $CO_2$ mass transfer rate of an absorbent comprising 5% by weight of piperazine, 35% by weight of MDEA and 60% by weight of water. The mass transfer rate was determined in a laminar jet chamber using water-vapor-saturated acid gas at 1 bar and 70° C., jet diameter 0.94 mm, jet length 1-8 cm, absorbent flow rate 1.8 ml/s, and the gas volumes were determined in cubic meters under standard conditions per unit surface area of the absorbent, unit pressure and unit time ($m^3(STP)/m^2/bar/h$).

Under the conditions used here (T=70° C.; $pCO_2$=0.7 bar), a $CO_2$ mass transfer rate of 24.5 $m^3(STP)/m^2/bar/h$ was found for the inventive absorbent and of 17.4 $m^3(STP)/m^2/bar/h$ for the comparison absorbent.

Relative to the comparison absorbent, a mass transfer rate higher by 40% was thus found.

This mixture was tested on an industrial scale in a plant operating in accordance with FIG. 1.

a) On account of the higher loading capacity and rate, a reduced solvent circulation rate was achieved. This led to a markedly lower specific energy requirement for regeneration. The reboiler duty stream flow changed from 130 lb/h to 90 lb/h owing to the change in absorbent.

b) At the same time, the corrosion tendency in the existing plant was significantly reduced. The Fe content in the absorbent was decreased from 30 to 5 ppm by the change in absorbent.

We claim:

1. An absorbent for removing acid gases from fluids, comprising
    a) at least one tertiary alkanolamine selected from the group consisting of methyldiethanolamine, triethanolamine, ethyldiethanolamine or diethylethanolamine;
    b) an amine which is selected from hydroxyethylpiperazine, or a mixture of hydroxyethylpiperazine and bis (hydroxyethylpiperazine); and
    c) piperazine.

2. The absorbent according to claim 1 which comprises methyldiethanolamine, piperazine and a mixture of hydroxyethylpiperazine and bis(hydroxyethylpiperazine).

3. The absorbent according to claim 1 in which the total amine content is in the range 20-70 percent by weight, based on the total weight of the absorbent.

4. The absorbent according to claim 1 in which the concentration of the amine b) is in the range 1-10 percent by weight, based on the total weight of the absorbent.

5. The absorbent according to claim 1 which comprises piperazine in an amount in the range 1-30 percent by weight, based on the total weight of the absorbent.

6. The absorbent according to claim 1 which additionally comprises a physical solvent for acid gases.

7. A process for absorbing acid gases from fluid streams in which the fluid stream is contacted with an absorbent according to claim 1, a fluid stream depleted in acid gases and an absorbent loaded with acid gases being obtained.

8. The absorbent according to claim 2 in which the total amine content is in the range 20-70 percent by weight, based on the total weight of the absorbent.

9. The absorbent according to claim 2 in which the concentration of the amine b) is in the range 1-10 percent by weight, based on the total weight of the absorbent.

10. The absorbent according to claim 3 in which the concentration of the amine b) is in the range 1-10 percent by weight, based on the total weight of the absorbent.

11. The absorbent according to claim 2 which comprises piperazine in an amount in the range 1-30 percent by weight, based on the total weight of the absorbent.

12. The absorbent according to claim 3 which comprises piperazine in an amount in the range 1-30 percent by weight, based on the total weight of the absorbent.

13. The absorbent according to claim 4 which comprises piperazine in an amount in the range 1-30 percent by weight, based on the total weight of the absorbent.

14. The absorbent according to claim 2 which additionally comprises a physical solvent for acid gases.

15. The absorbent according to claim 3 which additionally comprises a physical solvent for acid gases.

16. The absorbent according to claim 4 which additionally comprises a physical solvent for acid gases.

17. The absorbent according to claim 5 which additionally comprises a physical solvent for acid gases.

18. A process for absorbing acid gases from fluid streams in which the fluid stream is contacted with an absorbent according to claim 2, a fluid stream depleted in acid gases and an absorbent loaded with acid gases being obtained.

19. A process for absorbing acid gases from fluid streams in which the fluid stream is contacted with an absorbent according to claim 3, a fluid stream depleted in acid gases and an absorbent loaded with acid gases being obtained.

20. A process for absorbing acid gases from fluid streams in which the fluid stream is contacted with an absorbent according to claim 4, a fluid stream depleted in acid gases and an absorbent loaded with acid gases being obtained.

* * * * *

UNITED STATES PATENT AND TRADEMARK OFFICE
CERTIFICATE OF CORRECTION

PATENT NO. : 7,374,734 B2 Page 1 of 1
APPLICATION NO. : 10/545023
DATED : May 20, 2008
INVENTOR(S) : Christoph Grossman et al.

It is certified that error appears in the above-identified patent and that said Letters Patent is hereby corrected as shown below:

On the Title Page:

Item [56] at References Cited, In the U.S. Patent Documents, "4,999,031 A 3/1991 Gerhardt" Space should read -- 4,994,031 A 3/1991 Gerhardt --.

Signed and Sealed this

Twelfth Day of August, 2008

JON W. DUDAS
*Director of the United States Patent and Trademark Office*